Jan. 25, 1955     J. R. BUKEY ET AL     2,700,630
VINYL LEATHER PRODUCTS AND PROCESS OF PRODUCING SAME
Filed Sept. 18, 1952
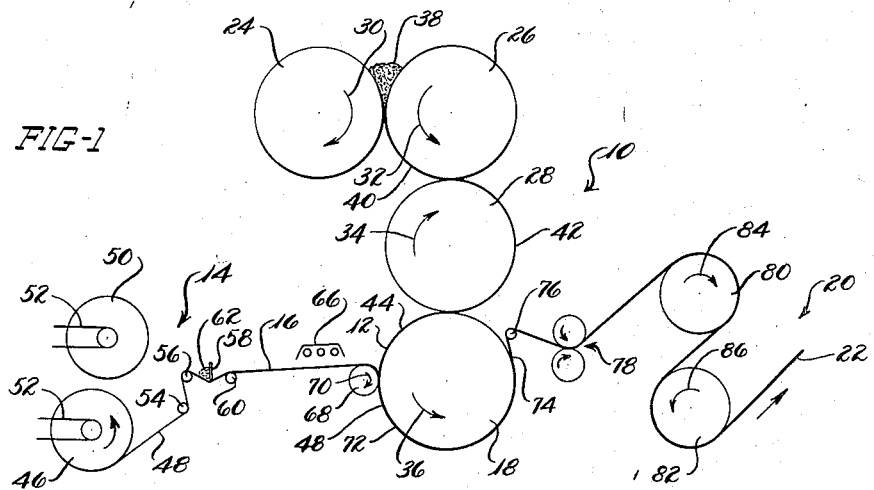
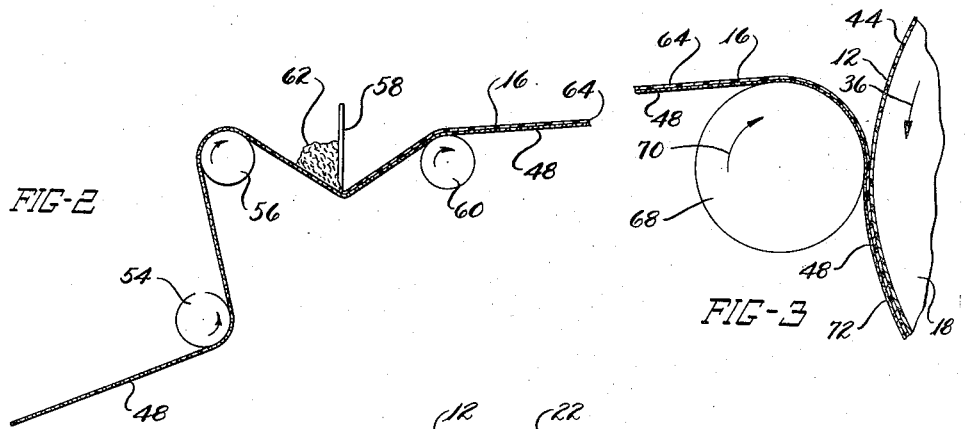
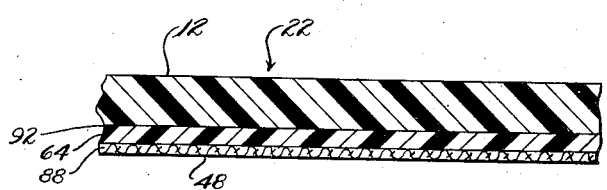
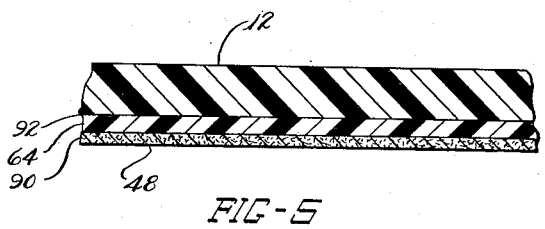
INVENTORS
JOHN R. BUKEY
ALBERT G. SMOLKA
BY W. A. Fraser
ATTY

United States Patent Office 2,700,630
Patented Jan. 25, 1955

2,700,630

VINYL LEATHER PRODUCTS AND PROCESS OF PRODUCING SAME

John R. Bukey, Douglassville, Pa., and Albert G. Smolka, New Haven, Conn., assignors to The Firestone Tire & Rubber Company, Akron, Ohio, a corporation of Ohio Application September 18, 1952, Serial No. 310,314

9 Claims. (Cl. 154—102)

This invention relates to novel web-material backed vinyl chloride resin leather products, and to a process of producing the same.

In general vinyl chloride resin leather products are of two types. First, there are those consisting of a simple unsupported sheet of plasticised vinyl chloride resin produced by calendering; these have the advantage that they may be compounded with relatively small quantities of plasticisers, so that the surfaces of these products are quite hard and scuff-resistant. However, these unsupported leather products are not well adapted to upholstery applications where the leather must be stretched over compound-curved surfaces such as cushions, and held in place with tacks; the tacks tend to pull out, and the stretched leather is easily punctured and torn in the stretched areas backed only by soft cushion material. Also these unsupported leathers are difficult to adhere to luggage shells and the like, since any adhesive capable of bonding with the vinyl leather would tend to shrivel it.

Another type of vinyl leather comprises a textile fabric, paper or other web-material backing, coated with a vinyl chloride resin composition deposited from solution or, in more recent practice, from a plastisol paste. Such products are resistant to tearing in upholstery applications, and the web-material backing provide anchorage for adhesively securing the leathers to luggage shells and the like. However, the vinyl chloride resin in such products must be compounded with rather large proportions of plasticisers, which result in products having surfaces which are undesirably soft and susceptible to scratching, scuffing and cutting. Likewise products are made by calendering a vinyl chloride resin composition onto a fabric backing, this process being termed "bank-skimming"; however, products made by this process have a high degree of impregnation of the plastic into the interstices of the fabric, which decreases the tear resistance, and further exhibit "strike-through," i. e., a pronounced pattern of the fabric on the surface of the combined sheet.

Accordingly it is an object of this invention to provide an improved vinyl chloride resin leather product.

Another object is to provide such a product having a hard, scuff- and scratch-resistant surface but being not readily subject to puncturing or tearing.

A further object is to provide a vinyl chloride resin leather product having a relatively hard surface of calendered vinyl resin composition secured to a web-material backing support by an intermediate layer of plastisol-type composition.

A further object is to provide a process and apparatus for the production of the products of the character outlined above.

Synopsis of the invention

The foregoing and other objects are secured, in accordance with this invention, by calendering a vinyl chloride resin leather facing sheet without a web-material backing, and then pressing a web-material backing against the film, the face of the web-material adjacent the film being coated with a flowable unconverted plastisol composition. The composite is then heated, whereby the plastisol coating is fluxed, and is converted into a homogeneous layer welded to, and merging with the calendered resin leather facing. Preferably, the laying up and heating of the composite is done while the calendered vinyl leather facing is still clinging to the last roll of the calender, the plastisol coated fabric being continuously supplied to and pressed against the calendered facing, and traveling around the roll along with the facing. The heat from the facing and from the hot calender roll brings about the aforesaid fluxing of the plastisol layer. The resultant product consists of the hard facing layer of calendered vinyl leather, bonded through the more resilient and flexible converted plastisol intermediate layer, to the web-material backing. It will be seen that the product combines the hard, mar and scuff resistant surface of the earlier unsupported calendered vinyl resin leather products, with the tear-resistance and tackability of the conventional web-material-backed vinyl resin leather products. Likewise, in comparison to the bank-skimmed fabrics, the coated products of this invention have greatly improved drape and flexibility, and are free from "strike-through."

The vinyl chloride resins

The vinyl chloride resins entering into the calendered film components and into the plastisol compositions of this invention are a well-known class of resins which may either be simple, unmixed homopolymers of vinyl chloride or copolymers thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40% of the extraneous comonomer is copolymerized therein, or conversely stated, if at least 60% of vinyl chloride is copolymerized therein, the percentages being based on the total weight of the resin. Suitable extraneous comonomers include, for instance vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate, and the like; vinylidene compounds on the order of vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like. For a fairly complete list of materials known to polymerize with vinyl chloride, reference may be had to Krczil, "Kurzes Handbuch der Polymerizations-Technik—II Mehrstoff Polymerization," Edwards Bros. Inc., 1945, pp. 735–747, the items under "Vinyl chlorid." As a rough rule, the criterion of a practical comonomer for use with vinyl chloride to produce copolymers containing 60% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $Q_{vinyl\ chloride} = .03$ and $e_{vinyl\ chloride} = .3$:

$$4.1 > \frac{.029 e^{-.3(.3-e_2)}}{Q_2} + .04 > .37$$
$$\overline{1.33 Q_2 e^{e_2(.3-e_2)} + .96}$$

Instead of the single unsaturated comonomers of the types above indicated, mixtures of such comonomers may enter into the copolymers, it being understood that the total quantity thereof shall be small enough (i. e., not over 40%, based on the weight of copolymer) that the essential character of the polyvinyl chloride chain is retained.

The plastisol compositions

These are a well-known class of compositions, the technology of which is described at considerable length in "Modern Plastics," November 1949, pp. 111 et seq. In general these compositions comprise pastes of finely divided vinyl chloride resins mechanically dispersed in liquid plasticisers. When cold, these pastes are flowable, and can be molded, slushed, spread upon fabrics or otherwise worked up into any desired conformation. Upon heating, the plasticiser fluxes with the vinyl chloride resin, producing a gel which, upon cooling, sets up in the form of a flexible, monolithic, plasticised vinyl chloride resin mass. The materials and process have hitherto been used for molding of small objects or coating fabrics. The finished compositions are relatively soft, by reason of the rather large amounts of plasticisers necessary to secure rapid and reliable setting up.

Any of the vinyl chloride resins mentioned above may be used in plastisol compositions, provided that the particles thereof are sufficiently fine, e. g., ranging from 1 to 5 microns. The plasticiser component may be any of the liquid plasticisers ordinarily used in vinyl chloride resins, such as the phthalates, on the order of di(2-ethyl hexyl) phthalate, di-n-octyl phthalate, butyl benzyl phthalate, di-butoxyethyl phthalate and the like; adipates, azelates and other esters of polymethylene dicarboxylic acids such as di-n-hexyl adipate, dinonyl adipate, di(butoxyethyl) adipate, di-3,5,5-trimethylhexyl adipate, dioctyl azelate and the like; glycolic acid derivatives such as methyl phthalyl ethyl glycolate and butyl phthalyl butyl glycolate; phosphates such as triphenyl phosphate, cresyl diphenyl phosphate, dicresyl 2-ethyl hexyl phosphate and the like; and fatty acid derivatives such as diethylene glycol pelargonate, butyl acetyl ricinoleate, methoxyethyl acetyl ricinoleate. The amount of plasticiser used may range from about 100% to about 150%, based on the weight of the vinyl chloride resin in the compositions. The plastisol compositions may also contain minor proportions of other compounding ingredients, such as stabilizers and pigments.

The web-material backing upon which the plastisol coating is deposited may be any fibrous web-material, either woven or felted, capable of withstanding the temperatures involved in fluxing the plastisol composition. Thus paper, rag felt, and cellulosic textile materials such as woven and knitted cotton and viscose rayon fabrics may be employed for this purpose.

The calendered vinyl chloride resin composition

This may be any composition conventional for this purpose, usually comprising basically a vinyl chloride resin plus a plasticiser. Ordinarily and preferably, these compositions are formulated to a greater hardness than is usual or possible with plastisol compositions; the calendering compositions will contain from 25% to 75% of plasticiser, based on the weight of vinyl chloride resin therein. These plasticisers may be any of the liquid plasticisers of the types set forth in connection with the plastisol compositions. Likewise the plasticisers for the calendered compositions need not be confined to the highly liquid plasticisers set forth above in connection with the plastisols, but may be viscous or semi-solid plasticisers such as the low molecular weight polycarboxylic acid-polyhydric alcohol condensates. The calendering composition may also include any of the pigments, fillers, stabilizing agents, lubricants, etc., usual in compositions designed for calendering into artificial leather products.

The uniting step

This consists in running the plastisol coated web-material against the freshly calendered vinyl chloride sheet, with the plastisol-coated side of the web-material against the calendered sheet, and heating the composite to fuse and gel the plastisol. Generally a temperature of from about 330° F. to about 360° F. will suffice for this purpose. It is necessary that the temperature be maintained for a sufficient length of time to fuse and gel the plastisol, say on the order of a few seconds, and the assembly is preferably cooled as rapidly as possible after attainment of fusion. By this step, the plastisol is converted into a homogeneous, flexible, tough, elastic, gel layer welded to the calendered facing sheet and bonding the same firmly and resiliently to the fibrous web-material backing. The combined sheet, prior to cooling may be embossed or polished by passing between suitable engraved or polished rolls as in Mason and Crisp 2,514,213. This uniting step is preferably effected by directing and pressing the plastisol-coated web-material upon the calendered sheet facing while the latter is still hot and clinging to the final roll of the calender stack, the coated side of the backing being against the calendered sheet. Heat from the roll and film effects gelation of the plastisol. The plastisol coating may be preheated, as by passing under heat lamps and such preheating may proceed to the extent of completely fluxing the plastisol or may supply only part of the heat required for this purpose, the balance being supplied by the heated calender roll.

The process and products of this invention will be described in connection with the annexed drawing in which:

Fig. 1 is a schematic diagram of the process and apparatus used in this invention;

Fig. 2 is a detailed view of a portion of the apparatus of Fig. 1;

Fig. 3 is a detailed view of another portion of the apparatus of Fig. 1;

Fig. 4 is a sectional view of a backed vinyl resin leather product according to this invention in which a cotton fabric is used as the backing; and Fig. 5 is a sectional view of a backed vinyl chloride resin leather product according to this invention, wherein the backing is a treated paper.

Referring more particularly to the drawing, the process of this invention may be carried out on the apparatus shown in Fig. 1, which shows a four-roll inverted L calender 10 which produces a calendered film 12, and a spreader unit 14 which supplies web-material 16 coated with plastisol composition, the web-material being united with the calendered film 12 upon the bottom roll 18 of the calender, and removed at 20 as a united laminate 22. More particularly, the calender 10 comprises a stack of heated rolls 24, 26, 28 and 18 revolving in near-contact with each other in the directions of the arrows 30, 32, 34 and 36 respectively. The rolls are journalled upon bearings in a conventional frame, the bearings and frame not being shown. A suitable vinyl chloride resin composition is supplied to the nip of the rolls 24, 26 so as to maintain a rolling bank 38 of resin therein. The film produced in the nip of the rolls 24, 26 follows around the roll 26 at 40 to the nip of the roll 26 with the roll 28; is reduced in that nip and follows around the roll 28 at 42 to the nip of the roll 28 with the roll 18; and is further reduced in this nip and follows around the roll 18 at 44 to be united with the plastisol-coated web-material 16.

The spreader unit more particularly comprises a supply reel 46 arranged to pay out the web-material 48 (textile fabric or paper) to the apparatus. An alternative supply reel 50 is provided to pay out web-material when the reel 46 is exhausted and is being reloaded, and vice versa. Both the reels 46 and 50 are provided with brakes 52 to maintain the web-material 48 taut while it is being payed out. The web-material 48 leaving the reel 46 passes under a roller 54, over a roller 56, under a doctor blade 58, over a roller 60, and thence onward to the calender apparatus 10, where it is united with the calendered film 12. A flowable plastisol composition is supplied behind the doctor blade 58 to maintain a pool 62 of the plastisol composition, which is spread as a thin layer 64 upon the upper surface web-material 48. Optionally, a bank of infra-red heating lamps 66 may be disposed above the web-material so as to play thereon and to preheat the plastisol coating before the web-material is united to the film 12.

The coated web-material coming from the spreader unit 14 passes over a roll 68 which revolves in the direction of the arrow 70 and presses the web-material against the calendered film 12 upon the bottom roll 18 of the calender 10. The web-material thus superimposed upon the film 12 travels therewith around the bottom roll 18 at 72, and the heat from the hot film 12 and the heated roll 18 activates the plastisol composition 64, causing it (to the extent that it has not already been activated by the heating lamps 66) to convert to the gel form, and causing it to weld to the film 12 and to the web-material to provide a tough, adherent and resilient bonding layer uniting the calendered film 12 to the web-material 48. The united layers of calendered film 12, converted plastisol 64 and web-material 48 are stripped from the roll 18 at 74, pass over a roll 76, and thence between a pair of embossing rolls 78 (these may be omitted if it is not desired to emboss the composite fabric) around a pair of cooling rolls 80, 82 which are positively driven in the direction of the arrows 84 and 86 so as to provide a portion of the tractive force necessary to draw the web-material 16 through the apparatus. The cooled fabric then passes to suitable windup and storage means, not shown.

The resultant composite fabric is shown on a large scale in Figs. 4 and 5, in which a woven fabric 88 and a paper web 90 were used respectively as the base web-material 48 in the process of Fig. 1. It will be seen that the plastisol layer 64 (now converted to the homogeneous, gelled state) keys firmly into the substrate web-material (textile fabric 88 or paper 90) and is welded to the calendered film layer 12 at the interface 92. The relatively hard calendered surface layer 12 provides good wear and scuff resistance, while the intermediate bonding layer 64 provides flexibility, toughness and resilience, besides, of course securing the surface layer 12 to the substrate web-material 88 or 90.

A typical run with the above described apparatus was conducted as follows:

EXAMPLE

Calender stock:                                            Parts
  Polyvinyl chloride (Exon 900, a product of
    The Firestone Plastics Co.) _____  100
  Dioctyl phthalate _____    42
  Calcium carbonate filler _____   20
  Cadmium mercaptide _____    3.5
Resin paste:
  Polyvinyl chloride (Exon 600 XR54, a product of The Firestone Plastics Co.) _____  100
  Dioctyl phthalate _____   50
  Methyl acetyl ricinoleate _____   18
  Diatomaceous earth filler _____   33
Fabric: 64 by 64 count, 2.10 weight cotton sheeting.
Paper: 10-point latex-impregnated kraft paper.

The ingredients set forth under "Calender stock" were combined in the indicated proportions as needed during the operation of the process in a Banbury at 350° F.; milled on Banbury mill at 330° F.; and advanced to a feed mill at 350° F., and fed while still hot in small increments to the bank 38 on the calender 10. The ingredients listed under "Resin paste" were combined in a pony mixer and the resultant mix was supplied as required to the pool 62 behind the doctor blade 58. Two runs were made, using the cotton sheeting fabric as the web-material 48 in one run and using the paper as the web-material in the other run.

Conditions during the runs were as follows:

Calender:
  Temperature of rolls—
    Roll 24 _____ 360° F.
    Roll 26 _____ 340° F.
    Roll 28 _____ 330° F.
    Roll 18 _____ 350° F.
  Diameter of rolls 24, 26, 28, 30 inches.
    and 18.
  Thickness of film 12 on roll .012 inch.
    18.
  Surface speed of film 12 and 10 yards per minute.
    web 16.
  Width of film 12 and web 16__ 54 inches.
Amount of plastisol coating on
  web 16:
    On cotton sheeting run_____ 2–4 ounces per square yard.
    On paper run_____ 2 ounces per square yard.
Wattage of heat lamps_____ 3000 watts.

The resultant web-material backed leather products had excellent mar-resistant vinyl chloride resin surfaces, free from varnish lifting tendencies. The leather-like products had acceptable drape and flexibility, and resin coatings were firmly anchored to the fabric backing.

From the foregoing general discussion and detailed specific examples, it will be evident that this invention provides a novel process and apparatus for the production of fabric backed vinyl leather products, which process and apparatus are simple and inexpensive and require only moderately skilled attendance. The leather products are well anchored to their web-material backings, and combine excellent flexibility and drape with a hard and mar-resistant surface.

What is claimed is:

1. Process which comprises hot-calendering a sheet of a vinyl chloride resin composition, coating a web-material with an unconverted vinyl chloride resin plastisol composition comprising particles, having diameters in the range from 1 to 5 microns, of a vinyl chloride resin mechanically dispersed in a liquid plasticizer therefor, laying up the calendered sheet of vinyl chloride resin and the coated web-material with the coated side of the web-material against the calendered sheet and with the plastisol composition in as-yet-unconverted form, and heating the composite to gel the plastisol and convert the same to a resilient bonding layer adhering the calendered sheet to the web-material.

2. Process which comprises hot calendering a sheet of a vinyl chloride resin composition containing from 25% to 75% of plasticizer, coating a web-material with an unconverted vinyl chloride resin plastisol composition comprising particles, having diameters in the range from 1 to 5 microns, of a vinyl chloride resin dispersed in from 100% to 150% of a liquid plasticiser therefor, the said percentages being on the basis of the resin in the respective compositions, laying up the calendered sheet of vinyl chloride resin and the coated web-material with the coated side of the web-material against the calendered sheet and with the plastisol composition in as-yet-unconverted form, and heating the composite to gel the plastisol and convert the same to a resilient bonding layer adhering the calendered sheet to the web-material.

3. Process which comprises continuously hot-calendering a sheet of a vinyl chloride resin composition containing from 25% to 75% of plasticiser, continuously coating a web-material with an unconverted vinyl chloride resin plastisol composition comprising particles, having diameters in the range from 1 to 5 microns, of a vinyl chloride resin dispersed in from 100% to 150% of a liquid plasticiser therefor, the said percentages being on the basis of the resins in the respective compositions, running the coated web-material against the calendered sheet while the latter is still clinging to the last roll of the calender upon which it is being formed, the coated face of the web-material being against the calendered sheet and the plastisol composition being in as-yet-unconverted form up to the time of its contact with the calendered sheet whereby the heat from the sheet and roll gels the plastisol and converts the same to a resilient bonding layer adhering the calendered sheet to the web-material, stripping the composite of calendered sheet, gelled plastisol and web-material from said roll, and cooling said composite.

4. Process which comprises continuously hot-calendering a sheet of a vinyl chloride resin composition containing from 25% to 75% of plasticiser, coating a textile fabric with an unconverted vinyl chloride resin plastisol composition comprising particles, having diameters in the range from 1 to 5 microns, of a vinyl chloride resin dispersed in from 100% to 150% of a liquid plasticiser therefor, the said percentages being on the basis of the resins in the respective compositions, running the coated textile fabric against the calendered sheet while the latter is still clinging to the last roll of the calender upon which it is being formed, the coated face of the textile fabric being against the calendered sheet and the plastisol composition being in as-yet-unconverted form up to the time of its contact with the calendered sheet, whereby the heat from the sheet and roll gels the plastisol and converts the same to a resilient bonding layer adhering the calendered sheet to the textile fabric, stripping the composite of sheet, gelled plastisol and textile fabric from said roll, and cooling said composite.

5. Process which comprises calendering a sheet of a vinyl chloride resin composition containing from 25% to 75% of plasticiser, coating a paper with an unconverted vinyl chloride resin plastisol composition comprising particles, having diameters in the range from 1 to 5 microns, of a vinyl chloride resin dispersed in from 100% to 150% of a liquid plasticiser therefor, the said percentages being on the basis of the resins in the respective compositions, running the coated paper against the calendered sheet while the latter is still clinging to the last roll of the calender upon which it is being formed, the coated face of the paper being against the calendered sheet and the plastisol composition being in as-yet-unconverted form up to the time of its contact with the calendered sheet, whereby the heat from the sheet and roll gels the plastisol and converts the same to a resilient bonding layer adhering the calendered sheet to the paper, stripping the composite of sheet, gelled plastisol and paper from said roll, and cooling said composite.

6. Process which comprises hot-calendering a sheet of a vinyl chloride resin composition, coating a web-material with an unconverted vinyl chloride resin plastisol composition comprising particles, having diameters in the range from 1 to 5 microns, of a vinyl chloride resin dispersed in a liquid plasticiser therefor, laying up the calendered sheet of vinyl chloride resin and the coated web-material with the coated side of the web-material against the calendered sheet and with the plastisol composition in as-yet-unconverted form up to the time of its contact with said calendered sheet, heating the composite to gel the plastisol and convert the same to a resilient bonding layer adhering the calendered sheet to the web-material, and embossing the composite while still hot by passing the same through engraved embossing rolls.

7. Process which comprises hot-calendering a sheet of a vinyl chloride resin composition, coating a web-material with an unconverted vinyl chloride resin plastisol composition comprising particles, having diameters in the range from 1 to 5 microns, of a vinyl chloride resin dispersed in a liquid plasticiser therefor, laying up the calendered sheet of vinyl chloride resin and the coated web-material with the coated side of the web-material against the calendered sheet and with the plastisol composition in as-yet-unconverted form up to the time of its contact with said calendered sheet, heating the composite to gel the plastisol and convert the same to a resilient bonding layer adhering the calendered sheet to the web-material, and polishing the composite while still hot by passing the same through engraved polishing rolls.

8. A backed vinyl chloride resin leather product comprising a textile fabric backing, a calendered vinyl chloride resin composition facing containing from 25% to 75% of plasticiser, and a gelled vinyl chloride resin plastisol composition containing from 100% to 150% of liquid plasticiser interposed between said textile fabric backing and said calendered vinyl chloride resin composition facing, said percentages being on the basis of the vinyl chloride resin in the respective compositions, and said gelled plastisol layer adhesively bonding together said facing to said textile fabric backing.

9. A backed vinyl chloride resin leather product comprising a paper backing, a calendered vinyl chloride resin composition facing containing from 25% to 75% of plasticiser, and a gelled vinyl chloride resin plastisol composition containing from 100% to 150% of liquid plasticiser interposed between said paper backing and said calendered vinyl chloride resin composition facing, said percentages being on the basis of the vinyl chloride resin in the respective compositions, said gelled plastisol layer adhesively bonding said facing to said paper backing.

References Cited in the file of this patent

UNITED STATES PATENTS

| Number | Name | Date |
|---|---|---|
| 2,070,600 | Jenett | Feb. 16, 1937 |
| 2,444,094 | Duggan | June 29, 1948 |
| 2,485,967 | Harding | Oct. 25, 1949 |